US012060657B2

(12) United States Patent
Kopping et al.

(10) Patent No.: US 12,060,657 B2
(45) Date of Patent: Aug. 13, 2024

(54) FILAMENTS BASED ON A CORE MATERIAL COMPRISING A FIBROUS FILLER

(71) Applicant: BASF SE, Ludwigshafen am Rhein (DE)

(72) Inventors: Jordan Thomas Kopping, Ludwigshafen am Rhein (DE); Bruno Inderbitzin, Basel (CH); Claus Gabriel, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 53 days.

(21) Appl. No.: 16/978,790

(22) PCT Filed: Feb. 25, 2019

(86) PCT No.: PCT/EP2019/054604
§ 371 (c)(1),
(2) Date: Sep. 8, 2020

(87) PCT Pub. No.: WO2019/170463
PCT Pub. Date: Sep. 12, 2019

(65) Prior Publication Data
US 2020/0407882 A1    Dec. 31, 2020

(30) Foreign Application Priority Data
Mar. 6, 2018 (EP) ..................... 18160132

(51) Int. Cl.
*B33Y 10/00* (2015.01)
*B29C 64/118* (2017.01)
*B33Y 70/10* (2020.01)
*B33Y 80/00* (2015.01)
*D01F 1/10* (2006.01)
*D01F 8/12* (2006.01)
*D01F 8/18* (2006.01)
*B29K 77/00* (2006.01)
*B29K 101/12* (2006.01)
*B29K 105/16* (2006.01)

(52) U.S. Cl.
CPC .............. *D01F 1/10* (2013.01); *B29C 64/118* (2017.08); *B33Y 10/00* (2014.12); *B33Y 70/10* (2020.01); *B33Y 80/00* (2014.12); *D01F 8/12* (2013.01); *D01F 8/18* (2013.01); *B29K 2077/00* (2013.01); *B29K 2101/12* (2013.01); *B29K 2105/16* (2013.01)

(58) Field of Classification Search
CPC ......... B33Y 70/00; B33Y 10/00; B33Y 80/00; D01F 1/10; D01F 8/12; D01F 8/18
See application file for complete search history.

(56) References Cited

U.S. PATENT DOCUMENTS

| | | | |
|---|---|---|---|
| 3,530,094 A | 9/1970 | Schnell et al. | |
| 3,535,280 A | 10/1970 | Schnell et al. | |
| 3,737,409 A | 6/1973 | Fox | |
| 4,169,186 A * | 9/1979 | Tazaki | B05D 7/20 428/406 |
| 4,767,813 A | 8/1988 | Evitt | |
| 5,121,329 A | 6/1992 | Crump | |
| 5,490,962 A * | 2/1996 | Cima | B33Y 80/00 264/401 |
| 5,738,817 A * | 4/1998 | Danforth | B22F 1/0059 264/603 |
| 6,031,053 A | 2/2000 | Knoll et al. | |
| 6,197,889 B1 | 3/2001 | Knoll et al. | |
| 9,126,365 B1* | 9/2015 | Mark | B29C 31/042 |
| 9,126,367 B1* | 9/2015 | Mark | B29C 64/386 |
| 2011/0190443 A1* | 8/2011 | Hideki Di Petta | C08K 3/34 524/789 |
| 2012/0231225 A1* | 9/2012 | Mikulak | D01F 8/12 428/172 |
| 2013/0252497 A1* | 9/2013 | Schiebel | D02G 3/447 442/181 |
| 2014/0252265 A1* | 9/2014 | Gabriel | C08K 3/013 252/75 |
| 2014/0287139 A1* | 9/2014 | Farmer | B29C 64/106 427/212 |
| 2014/0291886 A1* | 10/2014 | Mark | B29C 69/001 264/163 |

(Continued)

FOREIGN PATENT DOCUMENTS

| | | |
|---|---|---|
| DE | 1495730 A1 | 4/1969 |
| DE | 1300266 B | 7/1969 |
| JP | 2016-193602 A | 11/2016 |
| JP | 2018-523762 A | 8/2018 |
| WO | WO-9535335 A1 | 12/1995 |
| WO | WO-9740079 A1 | 10/1997 |
| WO | WO-0015718 A1 | 3/2000 |
| WO | WO-0026274 A1 | 5/2000 |
| WO | WO-0061664 A1 | 10/2000 |
| WO | WO-2013117428 A1 | 8/2013 |
| WO | WO-2015077262 A9 | 4/2016 |

(Continued)

OTHER PUBLICATIONS

International Preliminary Examination Report for PCT/EP2019/054604 dated Aug. 12, 2020.

(Continued)

*Primary Examiner* — Andrew D Graham
(74) *Attorney, Agent, or Firm* — Faegre Drinker Biddle & Reath LLP

(57) ABSTRACT

The invention relates to a filament comprising a core material (CM) comprising a fibrous filler (FF) and a thermoplastic polymer (TP1), and the core material (CM) is coated with a layer of shell material (SM) comprising a thermoplastic polymer (TP2). Further, the invention relates to a process for the preparation of said filament, as well as to three-dimensional objects and a process for the preparation thereof.

12 Claims, No Drawings

(56) References Cited

U.S. PATENT DOCUMENTS

| | | | |
|---|---|---|---|
| 2014/0328963 A1* | 11/2014 | Mark | B29C 64/209 425/143 |
| 2014/0328964 A1* | 11/2014 | Mark | B29C 64/393 425/166 |
| 2015/0028523 A1* | 1/2015 | Jaker | B29C 64/40 264/401 |
| 2015/0108677 A1* | 4/2015 | Mark | B33Y 70/10 425/375 |
| 2016/0024293 A1* | 1/2016 | Nestle | C04B 35/638 264/657 |
| 2016/0122541 A1* | 5/2016 | Jaker | C08L 81/00 264/219 |
| 2016/0152811 A1* | 6/2016 | Gardner | C08L 51/06 524/35 |
| 2016/0176109 A1* | 6/2016 | Farmer | B29C 64/245 264/171.1 |
| 2016/0177078 A1* | 6/2016 | Naito | C08L 67/04 264/109 |
| 2016/0273161 A1* | 9/2016 | Ho | B29C 70/50 |
| 2016/0297104 A1* | 10/2016 | Guillemette | B29B 11/16 |
| 2016/0325491 A1* | 11/2016 | Sweeney | B29C 64/264 |
| 2016/0361869 A1* | 12/2016 | Mark | B29C 70/20 |
| 2017/0268133 A1* | 9/2017 | Graley | D01F 1/10 |
| 2018/0021140 A1* | 1/2018 | Angelini | A61L 27/507 623/23.72 |
| 2018/0043617 A1* | 2/2018 | Sugiyama | B33Y 10/00 |
| 2018/0093413 A1 | 4/2018 | Yuasa et al. | |
| 2018/0202076 A1* | 7/2018 | Van Der Schaaf | C04B 35/584 |
| 2019/0352804 A1* | 11/2019 | Kopping | B33Y 70/00 |
| 2020/0061906 A1* | 2/2020 | Nakai | B33Y 10/00 |
| 2020/0156283 A1* | 5/2020 | Kopping | C04B 35/62897 |
| 2020/0407882 A1* | 12/2020 | Kopping | B33Y 10/00 |

FOREIGN PATENT DOCUMENTS

| | | |
|---|---|---|
| WO | WO-2017009190 A1 | 1/2017 |
| WO | 2017/221599 A | 12/2017 |
| WO | WO-2017212190 A1 | 12/2017 |

OTHER PUBLICATIONS

International Search Report for PCT/EP2019/054604 dated May 16, 2019.

Written Opinion of the International Searching Authority for PCT/EP2019/054604 dated May 16, 2019.

* cited by examiner

FILAMENTS BASED ON A CORE MATERIAL COMPRISING A FIBROUS FILLER

CROSS-REFERENCE TO RELATED APPLICATIONS

This application is a national stage application (under 35 U.S.C. § 371) of PCT/EP2019/054604, filed Feb. 25, 2019, which claims benefit of European Application No. 18160132.9, filed Mar. 6, 2018, both of which are incorporated herein by reference in their entirety.

The invention relates to a filament comprising a core material (CM) comprising a fibrous filler (FF) and a thermoplastic polymer (TP1), and the core material (CM) is coated with a layer of shell material (SM) comprising a thermoplastic polymer (TP2). Further, the invention relates to a process for the preparation of said filament, as well as to three-dimensional objects and a process for the preparation thereof.

One of the most used 3D printing technologies or additive manufacturing technologies is the fused deposition modeling (FDM), also known as fused filament fabrication process (FFF). For the production of three-dimensional objects, usually filaments of thermoplastic materials, provided on a spool, are deposited layer-by-layer through a heated nozzle on a base. Therefore, the thermoplastic material is heated to a temperature past its melting and/or glass transition temperature. The thermoplastic material and the temperature gradient are selected to enable its solidification essentially immediately upon contacting the base or a preceding layer of thermoplastic material extruded.

In order to form each layer, drive motors are provided to move the base and/or the extrusion nozzle (dispending head) relative to each other in a predetermined pattern along the x-, y- and z-axis. Fused deposition modeling (FDM) was first described in U.S. Pat. No. 5,121,329.

Industrially, thermoplastic materials in general are of particular importance on account of their very good mechanical properties. In particular, they possess high strength, stiffness, and toughness, good chemical resistance, and a high abrasion resistance and tracking resistance. Nevertheless, for some applications, for example in the automotive industry, it is necessary to further improve the chemical resistance, stiffness and dimensional stability of the thermoplastic materials. Therefore, they are usually strengthened by fibrous fillers.

However, the production of three-dimensional objects comprising fibrous fillers by fused filament fabrication is only possible if the content of the fibrous fillers in the filament does not exceed 15% by weight. Otherwise, the filaments cannot be rolled on a spool and have difficulties being fed into 3D printer nozzles due to their surface roughness and lack of lubricative properties.

WO 2017/009190 A1 discloses a filament comprising a core material coated with a layer of shell material, wherein the core material comprises an inorganic powder and a binder and the shell material comprises a thermoplastic polymer. The filament can be used for the production of three-dimensional metallic or ceramic objects.

However, the application of filaments comprising a core material (CM) comprising a fibrous filler and a first thermoplastic polymer, coated with a shell material comprising a second thermoplastic polymer, is not disclosed.

WO 2015/077262 A9 discloses 3D printer inputs including filaments comprising separated layers or sections. These inputs, particularly including filaments, may be prepared by co-extrusion, microlayer co-extrusion or multicomponent/fractal co-extrusion.

However, filaments comprising a core material coated with a layer of shell material, wherein the core material (CM) comprises a fibrous filler and a first thermoplastic polymer and the shell material comprises a second thermoplastic polymer, are not described.

Therefore, the object underlying the present invention is to provide new filaments for an application in an extrusion-based additive manufacturing system that can overcome the aforementioned disadvantages.

This object is achieved by a filament comprising a core material (CM) coated with a layer of shell material (SM), wherein
the core material (CM) comprises the components a) to c)
a) at least one fibrous filler (FF),
b) at least one thermoplastic polymer (TP1), and
c) optionally at least one additive (A),
and the shell material (SM) comprises the components d) to f)
d) at least one thermoplastic polymer (TP2),
e) optionally at least one fibrous filler (FF), and
f) optionally at least one additive (A).

One advantage of the inventive filaments is their higher mechanical stability compared to filaments prepared from the same core material (CM) but without the shell material (SM). In particular, the inventive filaments can be rolled on a spool, while filaments without shell material (SM) (monofilaments) are usually too brittle and therefore are not suited to be spooled.

Since the mechanical properties and therefore the processability of the inventive filaments in a conventional machine for a fused filament fabrication process (FFF) are mainly determined by the shell material (SM), there is more freedom of variation in regard to the composition of the core material (CM) compared to filaments without a shell material (SM).

For example, the inventive shell material (SM)-core material (CM) configuration allows for the use of significantly higher loads of fibrous filler (FF) in the core material (CM) that could result in a more brittle core. Actually, loads of fibrous filler (FF) up to 50% by weight, based on the total weight of the core material (CM), can be applied. Without a layer of shell material (SM) according to the invention it was not possible to consistently feed highly brittle material in the conventional machines used in the fused filament fabrication process (FFF).

In other words, the flexural radius at break of the inventive filaments is smaller than the flexural radius at break of the monofilaments. The flexural radius at break is the radius at which the (mono)filaments break. The smaller the flexural radius at break of the (mono)filaments, the more they can be bent around and the better they can be rolled on a spool.

Furthermore, it is also possible that the inventive filaments exhibit a tacky or extremely tacky core material (CM), which would without the presence of the shell material (SM) block the feeder mechanism. Consequently, by the inventive process, filaments for the application in a fused filament fabrication process (FFF) can be realized, which obtain a core material (CM) of ultra-low viscosity or of extreme tackiness.

In addition, in the fused filament fabrication process (FFF), the shell material (SM) of the inventive filaments functions as an adhesive between the layers of the three-dimensional body. Therefore, the inventive three-dimensional bodies exhibit an increased mechanical strength along the z-axis and hence a higher dimensional stability.

Moreover, the inventive three-dimensional bodies are already the finished component. Further treatment steps are not required. Thus, by using the inventive filaments, it is possible to prepare three-dimensional bodies with high loads of fibrous fillers in a very fast and simple way.

For the purpose of the present invention, the term "fibrous filler (FF)" means a filler which is significantly longer than it is wide and has the shape of a fiber. Preferably, the length-to-diameter ratio of the fibrous filler (FF) in the filament is from 3:1 to 2000:1, more preferably from 10:1 to 1000:1, most preferably from 20:1 to 500:1.

In a preferred embodiment, the fibrous filler (FF) in the filament has a length of 50 to 2000 µm, more preferably of 100 to 800 µm and most preferably of 150 to 400 µm. Further, in the filament, the fibrous filler (FF) has preferably a diameter of 4 to 60 µm, more preferably of 8 to 40 µm and most preferably of 10 to 20 µm.

The invention is specified in more detail as follows.

The filament comprises a core material (CM) coated with a layer of shell material (SM).

The filament may exhibit any length and/or diameter as deemed appropriate by the person skilled in the art.

Preferably, the diameter of the filament is 1 to 3 mm, more preferably 1.2 to 2.8 mm, most preferably 1.4 to 2.6 mm.

The layer of shell material (SM) may have any thickness as deemed appropriate by the person skilled in the art.

Preferably, the thickness of the layer of shell material (SM) is 0.04 to 0.6 mm, more preferably 0.06 to 0.3 mm.

The core material (CM) may have any diameter as deemed appropriate by the person skilled in the art.

Preferably, the diameter of the core material (CM) is 1 to 2 mm, more preferably 1.2 to 1.8 mm, most preferably 1.4 to 1.6 mm.

The core material (CM) comprises the components a) to c).

As component a), the core material (CM) comprises the at least one fibrous filler (FF).

The terms "component a)" and "fibrous filler (FF)" for the purpose of the present invention are synonymous and are used interchangeably throughout the present invention. "Fibrous filler (FF)" means precisely one fibrous filler (FF) as well as a mixture of two or more fibrous fillers (FF).

The core material (CM) may comprise the at least one fibrous filler (FF) in any amount as deemed appropriate by a person skilled in the art. Preferably, the core material (CM) comprises 10 to 50% by weight of the at least one fibrous filler (FF), more preferably 15 to 45% by weight, and most preferably 20 to 40% by weight, based on the total weight of the core material (CM).

As component a), any known fibrous filler (FF) can be used. Preferably, the at least one fibrous filler (FF) is selected from the group consisting of natural fibers, synthetic fibers and inorganic fibers.

Examples for suitable natural fibers are cellulose fibers, protein fibers and polylactide fibers.

Examples for suitable synthetic fibers are aramid fibers, polyacrylic fibers and polyester fibers such as polyethylene terephthalate fibers or polybutylene terephthalate fibers.

Examples for suitable inorganic fibers are ceramic fibers, glass fibers, carbon fibers and basalt fibers.

In case the fibrous fillers (FF) are glass fibers, the glass fibers are preferably composed of E, A, or C glass. The glass fibers can be used as rovings (continuous-filament fibers) or in the commercially available forms of chopped glass fibers (staple).

Preferably, the at least one fibrous filler (FF) is selected from synthetic fibers and inorganic fibers. More preferably, the at least one fibrous filler (FF) is selected from aramid fibers, glass fibers and carbon fibers, most preferably from glass fibers composed of E, A, or C glass and carbon fibers, particular preference is given to carbon fibers.

In one embodiment of the present invention, in case the fibrous fillers (FF) are carbon fibers, the carbon fibers do not comprise any metals and/or metal alloys and/or ceramic materials. Preferably, the carbon fibers do not comprise any metals, metal alloys and ceramic materials within this embodiment.

To improve the compatibility between the at least one thermoplastic polymer (TP1) or the at least one thermoplastic polymer (TP2) and the at least one fibrous filler (FF), the surface of the fibrous filler can be treated with a silane compound.

Suitable silanes are those according to the general formula (I)

$$(X-(CH_2)_g)_k-Si-(O-C_hH_{2h+1})_{4-k} \qquad (I)$$

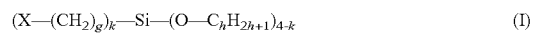

wherein g is 2 to 10, preferably 3 to 4, h is 1 to 5, preferably 1 to 2, k is 1 to 3, preferably 1, and X is an amino group, a glycidyl group or a hydroxy group.

Preferably, the silane compound is selected from the group consisting of aminopropyltrimethoxysilane, aminobutyltrimethoxysilane, aminopropyltriethoxysilane, aminobutyltriethoxysilane and also the corresponding silane compounds which contain a glycidyl group as substituent X.

Preferably, the fibrous filler (FF) comprises the silane compound in an amount of from 0.01 to 2% by weight, preferably of from 0.025 to 1% by weight and especially of from 0.05 to 0.5% by weight, based on the total weight of the fibrous filler (FF).

Suitable carbon fibers are commercially available under the trade name Tenax®, suitable glass fibers under the trade name Chopvantage®.

It is also possible to purchase thermoplastic polymers already reinforced by fibrous fillers (FF). For example, polyamides, reinforced by glass or carbon fibers, are available from BASF SE under the tradename Ultramid.

As component b), the core material (CM) comprises the at least one thermoplastic polymer (TP1).

The terms "component b)" and "thermoplastic polymer (TP1)" for the purpose of the present invention are synonymous and are used interchangeably throughout the present invention. "Thermoplastic polymer (TP1)" means precisely one thermoplastic polymer (TP1) as well as a mixture of two or more thermoplastic polymers (TP1).

The at least one thermoplastic polymer (TP1) may comprise thermoplastic homopolymers, thermoplastic copolymers, as well as blends of thermoplastic polymers.

The core material (CM) may comprise the at least one thermoplastic polymer (TP1) in any amount as deemed appropriate by a person skilled in the art. Preferably, the core material (CM) comprises 50 to 90% by weight of the at least one thermoplastic polymer (TP1), more preferably 55 to 85% by weight and most preferably 60 to 80% by weight, based on the total weight of the core material (CM).

As component b), any known thermoplastic polymers can be used. Preferably, the at least one thermoplastic polymer (TP1) of the core material (CM) is selected from the group consisting of impact-modified vinylaromatic copolymers, thermoplastic elastomers based on styrene (S-TPE), polyolefins (PO), aliphatic-aromatic copolyesters, polycarbonates, thermoplastic polyurethanes (TPU), polyamides (PA), polyphenylene sulfides (PPS), polyaryletherketones (PAEK), polysulfones and polyimides (PI), more preferably from impact-modified vinylaromatic copolymers, polyolefins (PO), aliphatic-aromatic copolyesters and polyamides (PA).

The at least one thermoplastic polymer (TP1) of the core material (CM) can be selected from impact-modified vinylaromatic copolymers.

Impact-modified vinylaromatic copolymers are known per se and are commercially available.

Preferred impact-modified vinylaromatic copolymers are impact-modified copolymers composed of vinylaromatic monomers and of vinyl cyanides (styrene acrylonitrile copolymers (SAN)). The preferred impact-modified SAN used preferably comprise acrylonitrile styrene acrylate (ASA) polymers and/or acrylonitrile butadiene styrene (ABS) polymers, or else (meth)acrylate-acrylonitrile-butadiene-styrene polymers ("MABS", transparent ABS), or else blends of SAN, ABS, ASA, and MABS with other thermoplastics, for example with polycarbonate, with polyamide (PA), with polyethylene terephthalate (PET), with polybutylene terephthalate (PBT), with polyvinyl chloride (PVC), or with polyolefins (PO).

The tensile strain at break values of the ASA and ABS that can be used as components b) are generally from 10% to 300%, preferably from 15% to 250%, particularly preferably from 20% to 200%.

The tensile strain at break values are determined in the tensile test to ISO 527-2:1996 on test specimens of 1 BA type (Annex A of the standard mentioned: "small test specimens").

ASA polymers are generally impact-modified SAN polymers which comprise elastomeric graft copolymers of vinylaromatic compounds, in particular styrene, and vinyl cyanides, in particular acrylonitrile, on polyalkyl acrylate rubbers in a copolymer matrix composed, in particular, of styrene and/or α-methylstyrene and acrylonitrile.

The at least one thermoplastic polymer (TP1) of the core material (CM) can also be selected from thermoplastic elastomers based on styrene (S-TPE).

Thermoplastic elastomers based on styrene (S-TPE) are also known per se and are commercially available.

Preferred styrene-based thermoplastic elastomers (S-TPE) are those whose tensile strain at break is more than 300%, particularly preferably more than 500%, in particular more than 500 to 600%. The S-TPE admixed particularly preferably comprise a linear or star-shaped styrene-butadiene block copolymer having external polystyrene blocks (S) and, situated between these, styrene-butadiene copolymer blocks having random styrene-butadiene distribution $(S/B)_{random}$ or having a styrene gradient $(S/B)_{taper}$ (e.g. Styroflex® or Styrolux® from BASF SE, K-Resin™ from CPC).

The total butadiene content is preferably in the range from 15 to 50% by weight, particularly preferably in the range from 25 to 40% by weight, and the total styrene content is correspondingly preferably in the range from 50 to 85% by weight, particularly preferably in the range from 60 to 75% by weight.

The styrene-butadiene block (S/B) is preferably composed of from 30 to 75% by weight of styrene and from 25 to 70% by weight of butadiene. An (S/B) block particularly preferably has a butadiene content of from 35 to 70% by weight and a styrene content of from 30 to 65% by weight.

The content of the polystyrene blocks (S) is preferably in the range from 5 to 40% by weight, in particular in the range from 25 to 35% by weight, based on the entire block copolymer. The content of the copolymer blocks (S/B) is preferably in the range from 60 to 95% by weight, in particular in the range from 65 to 75% by weight.

Particular preference is given to linear styrene-butadiene block copolymers of the general structure S—(S/B)—S having, situated between the two S blocks, one or more $(S/B)_{random}$ blocks having random styrene/butadiene distribution. Block copolymers of this type are obtainable via anionic polymerization in a non-polar solvent with addition of a polar co-solvent or of a potassium salt, as described by way of example in WO 95/35335 or WO 97/40079.

The vinyl content is the relative content of 1,2-linkages of the diene units, based on the entirety of 1,2-, 1,4-cis and 1,4-translinkages. The 1,2-vinyl content in the styrene-butadiene copolymer block (S/B) is preferably below 20%, in particular in the range from 10 to 18%, particularly preferably in the range from 12 to 16%.

The at least one thermoplastic polymer (TP1) of the core material (CM) can also be selected from polyolefins (PO).

Polyolefins (PO) are known per se and are commercially available. They are usually prepared by polymerization of $C_2$-$C_8$-alkene monomers, preferably by polymerization of $C_2$-$C_4$-alkene monomers.

Within the context of the present invention, $C_2$-$C_8$-alkene means unsubstituted or at least monosubstituted hydrocarbons having 2 to 8 carbon atoms and at least one carbon-carbon double bond (C—C-double bond). "At least one carbon-carbon double bond" means precisely one carbon-carbon double bond and also two or more carbon-carbon double bonds.

In other words, $C_2$-$C_8$-alkene means that the hydrocarbons having 2 to 8 carbon atoms are unsaturated. The hydrocarbons may be branched or unbranched. Examples for $C_2$-$C_8$-alkenes with one C—C-double bond are ethene, propene, 1-butene, 2-butene, 2-methyl-propene (=isobutylene), 1-pentene, 2-pentene, 2-methyl-1-butene, 3-methyl-1-butene, 1-hexene, 2-hexene, 3-hexene and 4-methyl-1-pentene. Examples for $C_2$-$C_8$-alkenes having two or more C—C-double bonds are allene, 1,3-butadiene, 1,4-pentadiene, 1,3-pentadiene, 2-methyl-1,3-butadiene (=isoprene).

If the $C_2$-$C_8$-alkenes have one C—C-double bond, the polyolefins (PO) prepared from those monomers are linear. If more than one double bond is present in the $C_2$-$C_8$-alkenes, the polyolefins (PO) prepared from those monomers can be crosslinked. Linear polyolefins (PO) are preferred.

It is also possible to use polyolefin (PO) copolymers, which are prepared by using different $C_2$-$C_8$-alkene monomers during the preparation of the polyolefins (PO).

Preferably, the polyolefins (PO) are selected from the group consisting of polymethylpentene, poly-1-butene, polyisobutylene, polyethylene and polypropylene. Particular preference is given to polyethylene and polypropylene and also their copolymers as are known to those skilled in the art and are commercially available.

The polyolefins (PO) can be prepared by any polymerization process known to the skilled person, preferably by free radical polymerization, for example by emulsion, bead, solution or bulk polymerization. Possible initiators are, depending on the monomers and the type of polymerization, free radical initiators such as peroxy compounds and azo compounds with the amounts of initiator generally being in the range from 0.001 to 0.5% by weight, based on the monomers.

The at least one thermoplastic polymer (TP1) of the core material (CM) can also be selected from polycarbonates.

Polycarbonates are also known per se and are commercially available.

The polycarbonates that can be used generally have tensile strain at break values of 20% to 300%, preferably of 30% to 250%, particularly preferably of 40% to 200%.

By way of example, they are obtainable by the processes of DE-B-1 300 266 via interfacial polycondensation or according to the process of DE-A-1 495 730 via reaction of diphenyl carbonate with bisphenols. Preferred bisphenol is 2,2-di(4-hydroxy-phenyl)propane, generally—and also hereinafter-termed bisphenol A.

Instead of bisphenol A, it is also possible to use other aromatic dihydroxy compounds, in particular 2,2-di(4-hydroxyphenyl)pentane, 2,6-dihydroxynaphthalene, 4,4'-dihydroxydiphenyl sulfane, 4,4'-dihydroxydiphenyl ether, 4,4'-dihydroxydiphenyl sulfite, 4,4'-dihydroxydiphenylmethane, 1,1-di(4-hydroxyphenyl)ethane, 4,4-dihydroxydiphenyl, or dihydroxydiphenylcycloalkanes, preferably dihydroxydiphenylcyclohexanes, or dihydroxycyclopentanes, in particular 1,1-bis(4-hydroxyphenyl)-3,3,5-trimethylcyclohexane, or else a mixture of the abovementioned dihydroxy compounds.

Particularly preferred polycarbonates are those based on bisphenol A or bisphenol A together with up to 80 mol % of the above mentioned aromatic dihydroxy compounds.

Polycarbonates with particularly good suitability as component b) are those which comprise units that derive from resorcinol esters or from alkylresorcinol esters, for example those described in WO 00/61664, WO 00/15718, or WO 00/26274. These polycarbonates are marketed by way of example by General Electric Company, the trademark being SollX®.

It is also possible to use copolycarbonates according to U.S. Pat. No. 3,737,409, and copolycarbonates based on bisphenol A and di(3,5-dimethyldihydroxyphenyl) sulfone are of particular interest here, and feature high heat resistance. It is also possible to use mixtures of different polycarbonates.

The form in which the polycarbonates are used may either be that of regrind or else that of pellets.

The at least one thermoplastic polymer (TP1) of the core material (CM) can also be selected from thermoplastic polyurethanes (TPU).

Thermoplastic polyurethanes (TPU) are polymers having carbamate units. Thermoplastic polyurethanes as well as their preparation are known to the skilled person.

Within the present invention, aliphatic thermoplastic polyurethanes (TPU) are preferred. They can, for example, be prepared by polyaddition of aliphatic polyisocyanates and aliphatic polyhydroxy compounds. Among the polyisocyanates, diisocyanates of the general formula (II) are preferred

$$OCN—R^7—NCO \quad (II)$$

wherein $R^7$ is a substituted or unsubstituted $C_1$-$C_{20}$-alkylene or $C_4$-$C_{20}$-cycloalkylene, wherein the substituents are selected from the group consisting of F, Cl, Br and $C_1$-$C_6$-alkyl.

Preferably $R^7$ is a substituted or unsubstituted $C_2$-$C_{12}$-alkylene or $C_6$-$C_{15}$-cycloalkylene.

Within the context of the present invention, definitions such as $C_1$-$C_{20}$-alkylene means $C_1$-$C_{20}$-alkanediyl. The $C_1$-$C_{20}$-alkylene is a hydrocarbon having two free valences and a carbon atom number of from 1 to 20. The $C_1$-$C_{20}$-alkylene according to the present invention can be branched or unbranched.

Within the context of the present invention, definitions such as $C_4$-$C_{20}$-cycloalkylene means $C_4$-$C_{20}$-cycloalkanediyl. A $C_4$-$C_{20}$-cycloalkylene is a cyclic hydrocarbon having two free valences and a carbon atom number of from 4 to 20. Hydrocarbons having two free valences, a cyclic and also a linear component and a carbon atom number of from 4 to 20 likewise fall under this definition.

Preferred diisocyanates are selected from the group consisting of hexamethylenediisocyanate, 2,2,4-trimethyl hexamethylenediisocyanate, 2,4,4-trimethyl hexamethylenediisocyanate, 1,2-diisocyanatomethyl cyclohexane, 1,4-diisocyanatomethyl cyclohexane and isophoronediisocyanate (IUPAC-name: 5-iso-cyanato-1-(isocyanatomethyl)-1,3,3-trimethyl-cyclohexane).

The diisocyanates may also be used in oligomeric, for example dimeric or trimeric form. Instead of the polyisocyanates, it is also possible to use conventional blocked polyisocyanates which are obtained from the stated isocyanates, for example by an addition reaction of phenol or caprolactam.

Suitable polyhydroxy compounds for the preparation of aliphatic polyurethanes are, for example, polyesters, polyethers, polyesteramides or polyacetales or mixtures thereof.

Suitable chain extenders for the preparation of the thermoplastic polyurethanes are low molecular weight polyols, in particular diols and polyamines, in particular diamines or water.

The thermoplastic polyurethanes (TPU) are preferably essentially uncrosslinked, i.e. they can be melted repeatedly without significant signs of decomposition. Their reduced specific viscosities are as a rule from 0.5 to 3 dl/g, preferably from 1 to 2 dl/g measured at 30° C. in dimethylformamide.

The at least one thermoplastic polymer (TP1) of the core material (CM) can also be selected from polyamides (PA).

Polyamides (PA) are also known per se and are commercially available.

The polyamides (PA) preferably comprise at least one unit selected from the group consisting of —NH—$(CH_2)_x$—NH— units in which x is 4, 5, 6, 7 or 8, —CO—$(CH_2)_y$—NH— units in which y is 3, 4, 5, 6 or 7 and —CO—$(CH_2)_z$—CO— units in which z is 2, 3, 4, 5 or 6.

The polyamides (PA) more preferably comprise at least one unit selected from the group consisting of —NH—$(CH_2)_x$—NH— units in which x is 5, 6 or 7, —CO—$(CH_2)_y$—NH— units in which y is 4, 5 or 6, and —CO—$(CH_2)_z$—CO— units in which z is 3, 4 or 5.

The polyamides (PA) especially preferably comprise at least one unit selected from the group consisting of —NH—$(CH_2)_6$—NH— units, —CO—$(CH_2)_5$—NH— units and —CO—$(CH_2)_4$—CO— units.

If the polyamides (PA) comprise at least one unit selected from the group consisting of —CO—$(CH_2)_y$—NH— units, these units are usually derived from lactams having 5 to 9 ring members, preferably from lactams having 6 to 8 ring members and especially preferably from lactams having 7 ring members.

Lactams are generally known to the person skilled in the art. For the purpose of the present invention, lactams are understood to mean cyclic amides. Preferably, the lactams used to prepare the polyamides (PA) comprise 4 to 8 ring carbon atoms, more 30 preferably 5 to 7 ring carbon atoms and especially preferably 6 ring carbon atoms.

Suitable lactams are, for example, selected from the group consisting of butyro-4-lactam (γ-lactam, γ-butyrolactam), 2-piperidone (δ-lactam, δ-valerolactam), hexano-6-lactam (ε-lactam, ε-caprolactam), heptano-7-lactam (ζ-lactam, ζ-heptanolactam) and octano-8-lactam (η-lactam, η-octanolactam).

The lactams are preferably selected from the group consisting of 2-piperidone (δ-lactam, δ-valerolactam), hexano-6-lactam (ε-lactam, ε-caprolactam) and heptano-7-lactam ('-lactam, ζ-heptanolactam).

If the polyamides (PA) comprise at least one unit selected from the group consisting of —NH—$(CH_2)_x$—NH— units, these units are usually derived from diamines. The polyamides (PA) are then preferably obtained via conversion of diamines, preferably via conversion of diamines with dicarboxylic acids.

Suitable diamines are generally known to the person skilled in the art and comprise 4 to 8 carbon atoms, preferably 5 to 7 carbon atoms and more preferably 6 carbon atoms.

Suitable amines are, for example, selected from the group consisting of 1,4-diaminobutane (butane-1,4-diamine, tetramethylene diamine, putrescine), 1,5-diaminopentane (pentamethylene diamine, pentane-1,5-diamine, cadaverine), 1,6-diaminohexane (hexamethylene diamine, hexane-1,6-diamine), 1,7-diamino-heptane and 1,8-diaminooctane. The diamines are preferably selected from the group consisting of 1,5-diaminopentane, 1,6-diaminohexane and 1,7-diaminoheptane. 1,6-diaminohexane is especially preferred.

Furthermore, the polyamides (PA) may comprise units derived from m-xylylene diamine, di-(4-aminophenyl)methane, di-(4-aminocyclohexyl)methane, 2,2-di-(4-aminophenyl)propane, 2,2-di-(4-aminocyclohexyl)propane and/or 1,5-diamino-2-methylpentane.

If the polyamides (PA) comprise at least one unit selected from the group consisting of —CO—$(CH_2)_z$—CO— units, these units are usually derived from dicarboxylic acids. The at least one polyamide (A) is then preferably obtained via conversion of dicarboxylic acids, preferably via conversion of dicarboxylic acids with diamines.

Suitable dicarboxylic acids are generally known to the person skilled in the art and comprise 4 to 8 carbon atoms, preferably 5 to 7 carbon atoms and more preferably 6 carbon atoms.

Suitable dicarboxylic acids are, for example, selected from the group consisting of butanedioic acid (succinic acid), pentanedioic acid (glutaric acid), hexanedioic acid (adipic acid), heptanedioic acid (pimelic acid) and octanedioic acid (suberic acid). The dicarboxylic acids are preferably selected from the group consisting of pentanedioic acid, hexanedioic acid and heptanedioic acid. Hexanedioic acid is especially preferred.

The polyamides (PA) may additionally comprise further units, for example, units derived from lactams having 10 to 13 ring members, such as capryllactam and/or lauryllactam.

Moreover, the polyamides (PA) may comprise units derived from aliphatic dicarboxylic acids having 9 to 36 carbon atoms, preferably 9 to 12 carbon atoms and more preferably 9 to 10 carbon atoms. In addition, aromatic dicarboxylic acids are also suitable.

Examples for such dicarboxylic acids are nonanedioic acid (azelaic acid), decanedioic acid (sebacic acid), dodecanedioic acid, isophthalic acid and/or terephthalic acid.

The following non-exhaustive listing comprises the abovementioned polyamides and also further polyamides suitable as component b) for the purposes of the invention (the monomers are indicated in parentheses):
PA 4 (pyrrolidone)
PA 6 (ε-caprolactam)
PA 7 (ethanolactam)
PA 8 (capryllactam)
PA 9 (9-aminononanoic acid)
PA 11 (11-aminoundecanoic acid)
PA 12 (laurolactam)
PA 46 (tetramethylenediamine, adipic acid)
PA 66 (hexamethylenediamine, adipic acid)
PA 69 (hexamethylenediamine, azelaic acid)
PA 610 (hexamethylenediamine, sebacic acid)
PA 612 (hexamethylenediamine, decanedicarboxylic acid)
PA 613 (hexamethylenediamine, undecanedicarboxylic acid)
PA 1212 (1,12-dodecanediamine, decanedicarboxylic acid)
PA 1313 (1,13-diaminotridecane, undecanedicarboxylic acid)
PA 6T (hexamethylenediamine, terephthalic acid)
PA 9T (nonyldiamine, terephthalic acid)
PA MXD6 (m-Xylylenediamine, adipic acid)
PA 6I (hexamethylenediamine, isophthalic acid)
PA 6-3-T (trimethylhexamethylenediamine, terephthalic acid)
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 (diaminodicyclohexylmethane, laurolactam)
PA 6I/6T/PACM (see PA 6I/6T and diaminodicyclohexylmethane)
PA 12/MACMI (laurolactam, dimethyildiaminodicyclohexylmethane, isophthalic acid)
PA 12/MACMT (laurolactam, dimethyldiaminodicyclohexylmethane, terephthalic acid)
PA PDA-T (phenylenediamine, terephthalic acid)

The present invention accordingly also provides a filament where the at least one thermoplastic polymer (TP1) of the core material (CM) is a polyamide (PA), preferably a polyamide (PA) selected from the group consisting of polyamide 4, polyamide 6, polyamide 7, polyamide 8, polyamide 9, polyamide 11, polyamide 12, polyamide 46, polyamide 66, polyamide 69, polyamide 610, polyamide 612, polyamide 613, polyamide 1212, polyamide 1313, polyamide 6T, polyamide 9T, polyamide MXD6, polyamide 6I, polyamide 6-3-T, polyamide 6/6T, polyamide 6/66, polyamide 6/12, polyamide 66/6/610, polyamide 6I/6T, polyamide PACM 12, polyamide 6I/6T/PACM, polyamide 12/MACMI, polyamide 12/MACMT and polyamide PDA-T.

These polyamides and their preparation are known. A person skilled in the art can find details regarding their preparation in "Ullmanns Enzyklopädie der Technischen Chemie", 4th edition, vol. 19, pp. 39-54, Verlag Chemie, Weinheim 1980, "Ullmanns Encyclopedia of Industrial Chemistry", Vol. A21, pp. 179-206, VCH Verlag, Weinheim 1992, and also Stoeckhert, Kunststofflexikon, pp. 425-428, Hanser Verlag, Munich 1992 (keyword "Polyamide" and the following).

Preferably, the polyamides (PA) are selected from the group consisting of polyamide 6, polyamide 46, polyamide 66, polyamide 610, polyamide 6/12, polyamide 6/66, polyamide 6T, polyamide 9T, polyamide 6I, polyamide 6/6T and polyamide 6I/6T.

The polyamides (PA) generally have a viscosity number in the range of 30 to 350 ml/g, preferably in the range of 90 to 240 ml/g, and especially preferably in the range from 100 to 130 ml/g. The viscosity number is determined in a solution of 0.5% by weight of the polyamides (PA) in 100 ml of 96% strength by weight sulfuric acid at 25° C. in accordance with ISO 307.

The weight-average molecular weight ($M_w$) of the polyamides (PA) is customarily in the range from 500 to 2 000 000 g/mol, preferably in the range from 5 000 to 500 000 g/mol, and especially preferably in the range from 10 000 to 100 000 g/mol. The weight-average molecular weight ($M_w$) is determined according to ASTM D4001.

The melting temperature $T_M$ of the polyamides (PA) is customarily in the range from 80 to 330° C., preferably in the range from 150 to 250° C., and especially preferably in the range from 180 to 230° C., determined by differential scanning calorimetry (DSC) or by dynamic mechanical thermoanalysis (DMTA) for semicrystalline polyamides. For amorphous polyamides, $T_M$ is defined as the temperature at which the at least one polyamide (A) (having a minimum solution viscosity of 80 mL/g to ISO 307 in sulfuric acid) has at least a zero shear viscosity of 5000 Pa s and hence is processable in the melt (measured on a DHR-1 rotational rheometer from TA Instruments, plate/plate geometry, plate diameter 25 mm and sample height 1.0 mm. Deformation 1.0%, preheat time 1.5 min, and material dried under reduced pressure at 80° C. for 7 days beforehand).

The polyamides (PA) usually have a glass transition temperature ($T_g$). The glass transition temperature ($T_g$) of the polyamides (PA) are usually in the range from 0 to 160° C. and preferably in the range from 40 to 105° C.

The glass transition temperature ($T_g$) is determined via differential scanning calorimetry (DSC). The measurement of the glass transition temperature ($T_g$) is carried out under nitrogen atmosphere in heat/cool/heat cycles of 20° C./min, 20° C./min and 20° C./min, respectively. For the measurement, approximately 0.006 to 0.010 g of the substance were sealed in an aluminum crucible. In the first heating run, the samples are heated to 340° C., then rapidly cooled to 0° C. and then in the second heating run, heated to 340° C. The respective $T_g$ value is determined from the second heating run. This procedure to determine the glass transition temperature ($T_g$) is known to the person skilled in the art.

As component c), the core material (CM) optionally comprises at least one additive (A).

The terms "component c)" and "additive (A)" for the purpose of the present invention are synonymous and are used interchangeably throughout the present invention. "Additive (A)" means precisely one additive (A) as well as a mixture of two or more additives (A).

The core material (CM) may comprise the at least one additive (A) in any amount as deemed appropriate by a person skilled in the art. Preferably, the core material (CM) comprises 0 to 20% by weight, more preferably 0 to 15% by weight, and most preferably 0 to 10% by weight, based on the total weight of the core material (CM) of the at least one additive (A).

As component c), any known additives (A) can be used. Preferably, the additive (A) is selected from the group consisting of dispersants, stabilizers, pigments and tackifiers.

Dispersants are known per se and are commercially available.

35 Examples for suitable dispersants are oligomeric polyethylene oxides having a low molecular weight of from 200 to 600 g/mol, stearic acid, stearamides, hydroxystearic acids, fatty alcohols, fatty alcohol, fatty acid esters, sulfonates and block copolymers of ethylene oxide and propylene oxide and also, particularly preferably, polyisobutylene.

Further, the additive (A) may be selected from stabilizers, like UV-stabilizers and/or antioxidants.

The additive (A) may be selected from pigments, such as organic dyes and/or inorganic pigments.

The additive (A) may be selected from tackifiers, like polymers with a glass transition temperature below room temperature, which is preferably below 25° C. and/or terpene-derivatives.

The additive (A) may also be selected from the tackifiers as disclosed in WO 2013/117428 A1. An example for a commercially available tackifier is Acronal® A107.

Based on WO 2013/117428 A1 and applying the definitions of the components of the tackifiers in WO 2013/117428 A1, as tackifiers preferably dispersions are applied comprising at least one in water soluble dispersed polymerisate with a weighted average molecular weight of less than 50000 and a glas transition temperature higher or equal to −40° C. to lower or equal 0° C., preferably higher or equal −35° C. or equal 0° C., preferable of a monomer mixture comprising (a) at least 40% by weight of at least one C1 to C20-alkyl (meth) acrylate (b) 0 to 30% by weight of at least one vinyl aromate (c) at least 0.1% by weight of at least one acid monomer (d) 0 to 50% by weight of further monomers, wherein the amounts of the monomers are based on the sum of all monomers.

Furthermore, tackifiers may be applied as disclosed in U.S. Pat. No. 4,767,813 and as specified in the following 3 paragraphs.

According to U.S. Pat. No. 4,767,813, the tackifier may be rosin or a derivative of rosin having a ring and ball softening temperature from about 25° to 110° C., preferably from about 50° to 110° C.

Suitable tackifiers include rosin, hydrogenated rosin esters, glycerol of rosin such as triglycerol rosin esters, $C_{2-3}$ alkylene esters of rosin such as triethylene glycol esters of rosin and tripropylene glycol esters of rosin; rosin salts, disproportionated rosin salts, pentaerythritol and the polyterpene resins including alpha and beta pinene. Suitable resins are sold under the tradenames Staybelite Ester 3, Staybelite Ester 10, Pentalyn H and Hercolyn D.

The tackifier resin may be a $C_5$ or $C_9$ synthetic tackifier resin having a ring and ball softening point from about 10° to 100° C., preferably from about 50° to 100° C. Suitable resins are sold under the tradenames Piccovar, Hercotac, Picconal and Piccolyte. These tackifiers are polymerized from $C_9$ monomers, preferably aromatic and $C_5$ monomers, preferably aliphatic.

The shell material (SM) comprises the components d) to f).

As component d), the shell material (SM) comprises the at least one thermoplastic polymer (TP2).

The terms "component d)" and "thermoplastic polymer (TP2)" for the purpose of the present invention are synonymous and are used interchangeably throughout the present invention. "Thermoplastic polymer (TP2)" means precisely one thermoplastic polymer (TP2) as well as a mixture of two or more thermoplastic polymers (TP2).

The at least one thermoplastic polymer (TP2) may comprise thermoplastic homopolymers, thermoplastic copolymers, as well as blends of thermoplastic polymers.

The shell material (SM) may comprise the at least one thermoplastic polymer (TP2) in any amount as deemed appropriate by a person skilled in the art. Preferably, the shell material (SM) comprises 75 to 100% by weight, more preferably 80 to 98% by weight, and most preferably 90 to 95% by weight, based on the total weight of the shell material (SM), of the at least one thermoplastic polymer (TP2).

As component d), the person skilled in the art may select any technical appropriate thermoplastic polymer.

The thermoplastic polymer (TP2) in the shell material (SM) may be
i) the same as the at least one thermoplastic polymer (TP1) of the core material (CM), or
ii) different from the at least one thermoplastic polymer (TP1) of the core material (CM).

Preferably, the at least one thermoplastic polymer (TP2) of the shell material (SM) is selected from the group consisting of polyoxymethylene (POM), impact-modified vinylaromatic copolymers, thermoplastic elastomers based on styrene (S-TPE), polyolefins (PO), thermoplastic polyurethanes (TPU), polyamides (PA), polyethers (PETH), polycarbonates (PC), polyesters (PES), polyphenylene sulfides (PPS), polyaryletherketones (PAEK), polysulfones and polyimides (PI), preferably from polyolefins (PO), thermoplastic polyurethanes (TPU), polyamides (PA), polycarbonates (PC), polyesters (PES), polyphenylene sulfides (PPS), polyaryletherketones (PAEK), polysulfones and polyimides (PI).

The at least one thermoplastic polymer (TP2) of the shell material (SM) can be selected from polyethers (PETH).

Polyethers comprise repeating units of formula (III).

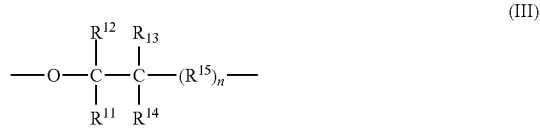

(III)

wherein
$R^{11}$ to $R^{14}$ are each independently of one another selected from the group consisting of H, $C_1$-$C_4$-alkyl and halogen-substituted $C_1$-$C_4$-alkyl;
$R^{15}$ is selected from the group consisting of a chemical bond, a ($-CR^{15a}R^{15b}-$) group and a ($-CR^{15a}R^{15b}O-$) group,
wherein
$R^{15a}$ and $R^{15b}$ are each independently of one another selected from the group of H and unsubstituted or at least monosubstituted $C_1$-$C_4$-alkyl,
wherein the substituents are selected from the group consisting of F, Cl, Br, OH and $C_1$-$C_4$-alkyl;
n is 0, 1, 2 or 3.

If n is 0, then $R^{15}$ is a chemical bond between the adjacent carbon atom and the oxygen atom. If $R^{15}$ is a ($-CR^{15a}R^{15b}O-$) group, then the oxygen atom (O) of the ($-CR^{15a}R^{15b}O-$) group is bound to another carbon atom (C) of formula (III) and not to the oxygen atom (O) of formula (III). In other words, formula (III) does not comprise peroxide compounds. The same holds true for formula (IV).

Typical polyethers as well as their preparation are also known to the skilled person.

A preferred polyether according to the present invention is, for example, a poly(alkylene glycol), also known as a poly(alkylene oxide).

Polyalkylene oxides and their preparation are known to the skilled person. They are usually synthesized by interaction of water and a bi- or polyvalent alcohol with cyclic ethers, i.e. alkylene oxides, of the general formula (IV). The reaction is catalyzed by an acidic or basic catalyst. The reaction is a so called ring-opening polymerization of the cyclic ether of the general formula (IV).

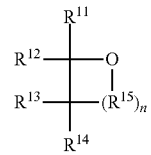

(IV)

wherein
$R^{11}$ to $R^{15}$ have the same meanings as defined above for formula (III).

A preferred poly(alkylene oxide) according to the present invention is derived from monomers of the general formula (IV) having 2 to 6 carbon atoms in the ring. In other words, preferably, the poly(alkylene oxide) is a poly($C_2$-$C_6$-alkylene oxide). Particular preference is given to a poly(alkylene oxide) derived from monomers selected from the group consisting of 1,3-dioxolane, 1,3-dioxepane and tetrahydrofuran (IUPAC-name: oxolane). In other words, particularly preferably, the poly(alkylene oxide) is selected from the group consisting of poly-1,3-dioxolane, poly-1,3-dioxepane and polytetrahydrofuran.

In one embodiment, the poly(alkylene oxide) can comprise OH-end groups. In another embodiment, at least some of the OH-end groups of the poly(alkylene oxide) can be capped. Methods for capping OH-end groups are known to the skilled person. For example, the OH-end groups can be capped by etherification or esterification.

The weight average molecular weight of the poly(alkylene oxide) is preferably in the range of from 1 000 to 150 000 g/mol, particular preferably from 15 00 to 120 000 g/mol and more preferably in the range of from 2 000 to 100 000 g/mol.

The shell material (SM) can comprise as component e) the at least one fibrous filler (FF).

The shell material (SM) may comprise the at least one fibrous filler (FF) in any amount as deemed appropriate by a person skilled in the art. Preferably, the shell material (SM) comprises 0 to 15% by weight of the at least one fibrous filler (FF), more preferably 0 to 10% by weight, and most preferably 0 to 5% by weight, based on the total weight of the shell material (SM).

The at least one fibrous filler of the shell material (SM) is identical to the fibrous filler (FF) defined for the core material (CM).

In a preferred embodiment, the shell material (SM) comprises 0% by weight, based on the total weight of the shell material (SM), of the at least one fibrous filler (FF) and therefore there is preferably no component e) present in the shell material (SM).

As component f), the shell material (SM) can comprise the at least one additive (A).

The shell material (SM) may comprise the at least one additive (A) in any amount as deemed appropriate by a person skilled in the art. Preferably, the shell material (SM) comprises 0 to 20% by weight of the at least one additive (A), more preferably 0 to 15% by weight, and most preferably 0 to 10% by weight, based on the total weight of the shell material (SM).

The at least one additive of the shell material (SM) is identical to the additive (A) defined for the core material (CM).

In one embodiment of the invention the core material (CM) comprises the components a), b) and c)

a) 10 to 50% by weight, preferably 15 to 45% by weight, more preferably 20 to 40% by weight, based on the total weight of the core material (CM), of at least one fibrous filler (FF), b) 50 to 90% by weight, preferably 55 to 85% by weight, more preferably 60 to 80% by weight, based on the total weight of the core material (CM) of the at least one thermoplastic polymer (TP1), c) 0 to 20% by weight, preferably 0 to 15% by weight, more preferably 0 to 10% by weight, based on the total weight of the core material (CM) of the at least one additive (A), and/or the shell material (SM) comprises the components d) and f)

d) 75 to 100% by weight, preferably 80 to 98% by weight, more preferably 90 to 95% by weight, based on the total weight of the shell material (SM) of at least one thermoplastic polymer (TP2), e) 0 to 15% by weight, preferably 0 to 10% by weight, more preferably 0 to 5% by weight, based on the total weight of the shell material (SM) of at least one fibrous filler (FF), f) 0 to 20% by weight, preferably 0 to 15% by weight, more preferably 0 to 10% by weight, based on the total weight of the shell material (SM) of at least one additive (A).

In a further embodiment of the invention the core material (CM) comprises the components a), b) and c)

a) 10 to 50% by weight, preferably 15 to 45% by weight, more preferably 20 to 40% by weight, based on the total weight of the core material (CM), of at least one fibrous filler (FF), b) 50 to 90% by weight, preferably 55 to 85% by weight, more preferably 60 to 80% by weight, based on the total weight of the core material (CM) of the at least one thermoplastic polymer (TP1), c) 0 to 20% by weight, preferably 0 to 15% by weight, more preferably 0 to 10% by weight, based on the total weight of the core material (CM) of the at least one additive (A), and/or the shell material (SM) comprises the components d) and f)

d) 100% by weight, based on the total weight of the shell material (SM) of at least one thermoplastic polymer (TP2), e) 0% by weight, based on the total weight of the shell material (SM) of at least one fibrous filler (FF), f) 0% by weight, based on the total weight of the shell material (SM) of at least one additive (A).

A further subject of the invention is a process for the preparation of the filament as described above, wherein a core material (CM) is coated with a layer of a shell material (SM) by co-extrusion of the core material (CM) with the shell material (SM).

The co-extrusion technique as such is known to the person skilled in the art.

Based on the applied materials for the core and the shell material, the person skilled in the art may choose the respective appropriate co-extrusion temperatures and process parameters.

Another subject of the invention is a process for preparation of a three-dimensional object by a fused filament fabrication process, comprising at least the steps a), b), c), a) providing the filament as described above on a spool to a nozzle, b) heating the filament to a temperature ($T_M$), c) depositing of the heated filament obtained in step b) in a build plate using a layer based additive technique in order to form the three dimensional object.

The fused filament fabrication process for the production of three-dimensional objects is well known in the state of the art and detailed explained in the above cited documents. The fused filament fabrication process is also denominated as 3D-printing process.

According to step a), the filament according to the present invention, is provided on a spool to a nozzle.

According to step b), the filament is heated to a temperature ($T_M$). The temperature ($T_M$) is above the melting point of the at least one thermoplastic polymer (TP1). Methods for the determination of the melting point of the at least one thermoplastic polymer (TP1) are known to the skilled person. For example, the melting point of the at least one thermoplastic polymer (TP1) can be estimated by differential scanning calorimetry (DSC).

In a preferred embodiment according to the present invention, in process step b) the filament is heated to a temperature ($T_M$) that is at least 1° C., preferably at least 5° C. and particularly preferably at least 10° C. above the melting point of the at least one thermoplastic polymer (TP1).

In another preferred embodiment the filament is heated to a temperature ($T_M$) in the range of from 140 to 400° C., preferably of from 160 to 380° C.

According to step c), the filament is deposited into a build plate using the layer-based additive technique. The temperature of the build plate is usually in the range of from 30 to 150° C., preferably of from 40 to 120° C. and particularly preferably of from 60 to 100° C.

In other words, in step a) to c) of the inventive process, the filament generally is initially present in a solid state and thereafter melted and printed to form a three-dimensional object comprising the filament.

A further subject of the invention is also the three-dimensional object prepared by the processes as specified above.

The following examples further illustrate the invention.

The filaments in the examples E1 and E2 (according to the invention) were prepared by co-extrusion of the core material (CM) and the shell material (SM) applying the following materials, equipment and processing parameters.

Materials:

Core material (CM) for examples E1 and E2 (according to the invention):

E1: Nylon 6.6 with 20% by weight of carbon fibers (80% by weight of polyamide 66, 20% by weight of carbon fibers (CF); tradename: Ultramid A3WC4)

E2: Nylon 6.6 with 50% by weight of glass fibers (50% by weight of polyamide 66, 50% by weight of glass fibers (GF); tradename: Ultramid A3WG10) Shell material (SM) for examples E1 and E2 (according to the invention):

E1: Nylon 6.6 (100% by weight of polyamide 66; tradename Ultramid A3W)

E2: Nylon 6.6 (100% by weight of polyamide 66; tradename Ultramid A3W)

Equipment:

Extrusion Equipment:

Core: ZSK 25 Twin Screw Extruder

Shell: Teach-Line E20T single screw extruder with a Polyolefin Screw 8/6/11 with compression 3.08

Nozzle: Modified blow mold die with matrix diameter of 3.6 mm

Additional Equipment:
Waterbath
Conveyor BAW130T
Zumbach diameter measurement
Processing Parameters:
All polymers were dried before processing at 80° C. using an air dryer and conveyer speed of 7 m/min

EXAMPLE E1

Core Material (CM):
Extruder with 80% by weight of polyamide 66, 20% by weight of carbon fibers (Ultramid A3WC4)
Temperature Profile: 260° C./270° C./270° C./280° C./280° C., Skin Adapter 280° C., Die 280° C.
Outside Layer of Shell Material (SM):
Extruder with 100% by weight of polyamide 66 (Ultramid A3W)
Temperature Profile: 260° C./270° C./270° C./280° C./280° C., Skin Adapter 280° C., Die 280° C.
Filament Properties:
Diameter 1.75 mm, Ovality 0.03 mm
Core diameter: 1.59 mm
Outside layer thickness: 0.08 mm

EXAMPLE E2

Core Material (CM):
Extruder with 50% by weight of polyamide 66, 50% by weight of glass fibers (Ultramid A3WG10)
Temperature Profile: 260° C./270° C./270° C./280° C./280° C., Skin Adapter 280° C., Die 280° C.
Outside Layer of Shell Material (SM):
Extruder with 100% by weight of polyamide 66 (Ultramid A3W) Temperature Profile: 260° C./270° C./270° C./280° C., Skin Adapter 280° C., Die 280° C.
Filament Properties:
Diameter 1.78 mm, Ovality 0.05 mm
Core diameter: 1.46 mm
Outside layer thickness: 0.16 mm The monofilaments in the examples C3 and C4 (comparative examples) were prepared by extrusion applying the following materials, equipment and processing parameters.
Materials:
C3: Nylon 6.6 with 20% by weight of carbon fibers (80% by weight of polyamide 66, 20% by weight of carbon fibers (CF); tradename: Ultramid A3WC4)
C4: Nylon 6.6 with 50% by weight of glass fibers (50% by weight of polyamide 66, 50% by weight of glass fibers (GF); tradename: Ultramid A3WG10)
The monofilaments were prepared from the same core material (CM) as the examples according to the invention but without the shell material (SM).
Equipment:
Extrusion Equipment:
Extruder: Teach-Line E20T single screw extruder with a Polyolefin Screw 8/6/11 with compression 3.08
Nozzle: Die with diameter of 3.6 mm
Additional Equipment:
Waterbath
Conveyor BAW130T
Zumbach diameter measurement
Processing Parameters:
All polymers were dried before processing at 80° C. using an air dryer and conveyer speed of 7 m/min

EXAMPLE C3

Monofilament:
Extruder with 80% by weight of polyamide 66, 20% by weight of carbon fibers (Ultramid A3WC4)
Temperature Profile: 260° C./270° C./270° C./280° C./280° C., Skin Adapter 280° C., Die 280° C.
Filament Properties:
Diameter 1.75 mm, Ovality 0.05 mm

EXAMPLE C4

Monofilament:
Extruder with 50% by weight of polyamide 66, 50% by weight of glass fibers (Ultramid A3WG10)
Temperature Profile: 260° C./270° C./270° C./280° C./280° C., Skin Adapter 280° C., Die 25 280° C.
Filament Properties:
Diameter 1.75 mm, Ovality 0.05 mm The flexural radius at break of the filaments in the examples E1 and E2 (according to the invention) and of the monofilaments in the examples C3 and C4 (comparative examples) was measured (Table 1).

TABLE 1

| Example | Core | Shell | Flexural radius at break [cm] |
|---|---|---|---|
| E1 | Ultramid A3WC4 | Ultramid A3W | 2.35 |
| C3 | Ultramid A3WC4 | none | 3.45 |
| E2 | Ultramid A3WG10 | Ultramid A3W | 3.70 |
| C4 | Ultramid A3WG10 | none | 11.15 |

The flexural radius at break of the (mono)filaments is the radius at which the (mono)filaments break. The smaller the flexural radius at break of the (mono)filaments, the more they can be bent around and consequently, the better they can be rolled on a spool.

As shown in Table 1, the filaments in the examples E1 and E2 (according to the invention) show a lower flexural radius at break than the corresponding monofilaments in the examples C3 and C4 (comparative examples). Therefore, the inventive filaments E1 and E2 can be more bent around and rolled on a spool without breaking. In other words, filaments according to the present invention having the same core material than the corresponding filaments of the comparative examples, but having an additional shell material have an improved performance in terms of flexibility due to a lower flexural radius at break.

The invention claimed is:
1. A filament comprising a core material (CM) coated with a layer of shell material (SM),
wherein
the core material (CM) comprises components a) to c)
a) 15 to 45% by weight, based on the total weight of the core material (CM), of at least one fibrous filler (FF),
b) 55 to 85% by weight, based on the total weight of the core material (CM), of at least one thermoplastic polymer (TP1), and
c) 0 to 15% by weight, based on the total weight of the core material (CM), of at least one additive,
and the shell material (SM) comprises components d) to f)
d) 75 to 100% by weight, based on the total weight of the shell material (SM), of at least one thermoplastic polymer (TP2), e) 0 to 15% by weight, based on the total weight of the shell material (SM), of at least one fibrous filler (FF), and f) 0 to 20% by weight, based on the total weight of the shell material (SM), of at least one additive, wherein the at least one thermoplastic polymer (TP2) of the shell material (SM) is the same as the at least one thermoplastic polymer (TP1) of the core material (CM), and wherein the at least one thermoplastic polymer (TP1) is a polyamide (PA) selected from the group consisting of polyamide 6, polyamide 46, polyamide 66, polyamide 610, polyamide 6/12, polyamide 6/66, polyamide 6T, polyamide 9T, polyamide 6I, polyamide 6/6T and polyamide 6I/6T, and wherein the at least one fibrous filler (FF) is selected from carbon fibers; and wherein the diameter of the core material (CM) is 1.2 to 1.8 mm and the thickness of the layer of shell material (SM) is 0.06 to 0.3 mm.

2. The filament according to claim 1, wherein the surface of the fibrous filler (FF) is treated with a silane compound.

3. The filament according to claim 1, wherein
i) the length-to-diameter ratio of the fibrous filler (FF) is from 3:1 to 2000:1, and/or
ii) the fibrous filler (FF) has a length of 50 to 2000 μm, and/or
iii) the fibrous filler (FF) has a diameter of 4 to 60 μm.

4. The filament according to claim 1, wherein the diameter of the filament is 1 to 3 mm.

5. The filament according to claim 1, wherein the at least one additive is selected from the group consisting of dispersants, stabilizers, pigments and tackifiers.

6. A process for the preparation of a filament according to claim 1, wherein a core material (CM) is coated with a layer of a shell material (SM) by co-extrusion of the core material (CM) with the shell material (SM).

7. A process for preparation of a three-dimensional object, by a fused filament fabrication process, comprising at least the steps a), b), c),
a) providing the filament according to claim 1 on a spool to a nozzle,
b) heating the filament to a temperature ($T_M$),
c) depositing of the heated filament obtained in step b) in a build plate using a layer based additive technique in order to form the three-dimensional object.

8. The process according to claim 7, wherein the temperature ($T_M$) in step b) is 140 to 400° C.

9. A three-dimensional object, prepared by the process according to claim 7.

10. The filament according to claim 2, wherein the surface of the fibrous filler (FF) is treated with a silane compound according to the general formula (I)

$$(X-(CH_2)_g)_k-Si-(O-C_hH_{2h+1})_{4-k} \qquad (I)$$

wherein
g is 2 to 10,
h is 1 to 5,
k is 1 to 3, and
X is an amino group, a glycidyl group or a hydroxy group.

11. The filament according to claim 3, wherein
i) the length-to-diameter ratio of the fibrous filler (FF) is from 10:1 to 100:1, and/or
ii) the fibrous filler (FF) has a length of 100 to 800 μm, and/or
iii) the fibrous filler (FF) has a diameter of 8 to 40 μm.

12. The filament according to claim 4, wherein
i) the diameter of the filament is 1.2 to 2.8 mm, and/or
ii) the diameter of the core material (CM) is 1.2 to 1.8 mm, and/or
iii) the thickness of the layer of shell material (SM) is 0.06 to 0.3 mm.

* * * * *